No. 648,602. Patented May 1, 1900.
J. E. THROPP, Jr.
MACHINE FOR CUTTING RUBBER SEALING RINGS FOR JARS. &c.
(Application filed Oct. 25, 1899.)
(No Model.) 2 Sheets—Sheet 1.
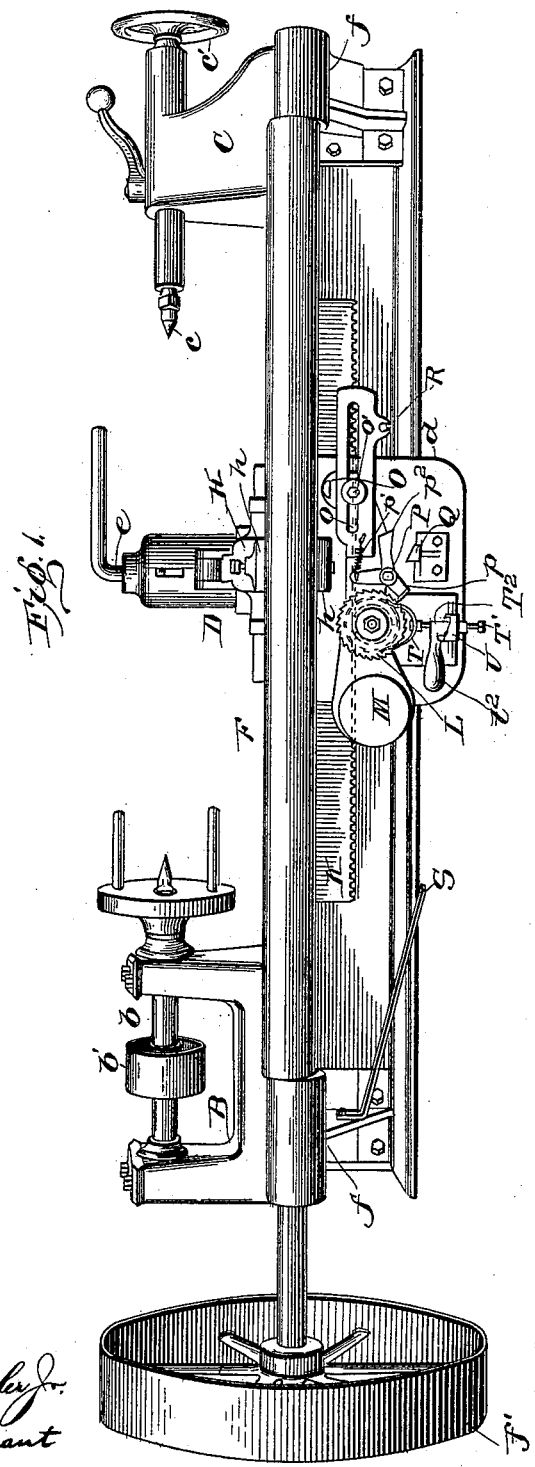

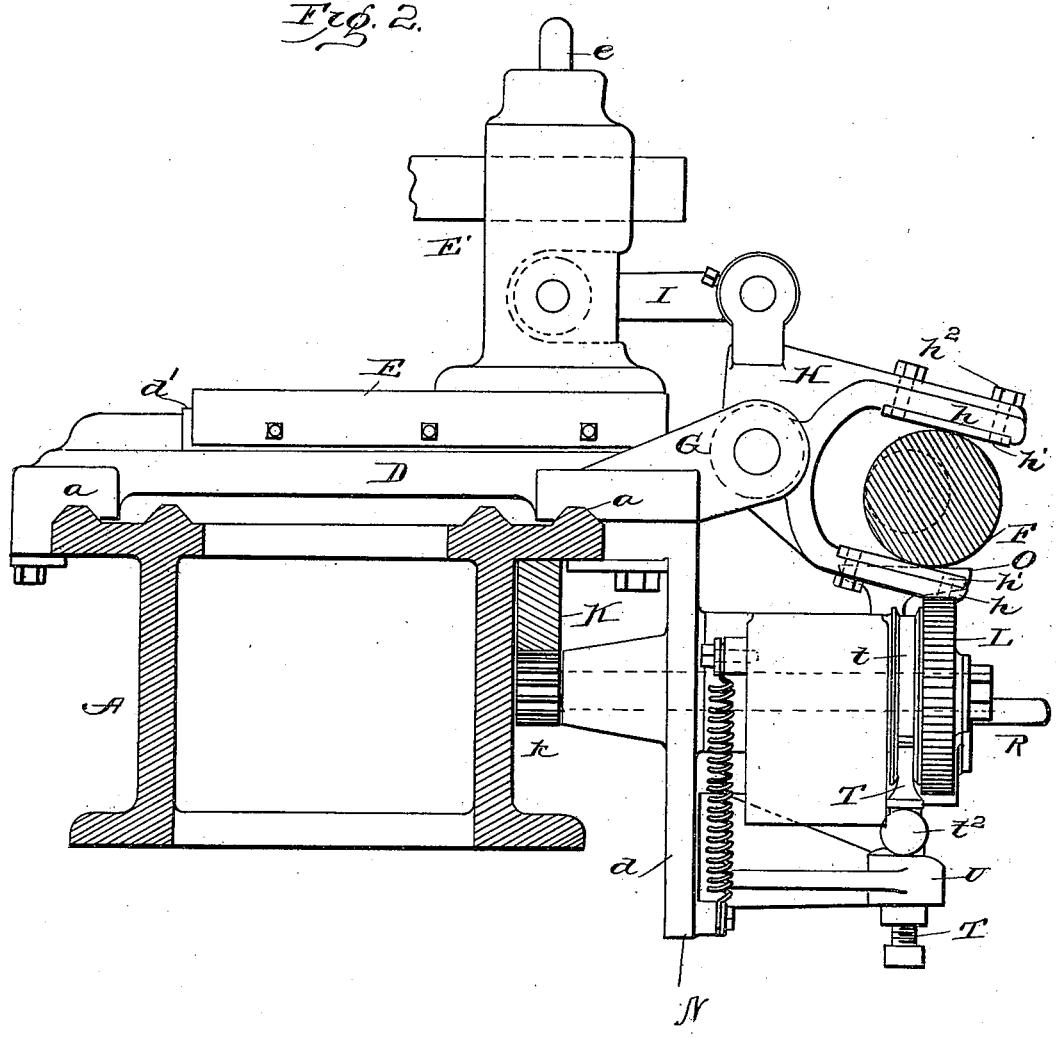

UNITED STATES PATENT OFFICE.

JOHN E. THROPP, JR., OF TRENTON, NEW JERSEY.

MACHINE FOR CUTTING RUBBER SEALING-RINGS FOR JARS, &c.

SPECIFICATION forming part of Letters Patent No. 648,602, dated May 1, 1900.

Application filed October 25, 1899. Serial No. 734,774. (No model.)

*To all whom it may concern:*

Be it known that I, JOHN E. THROPP, Jr., a citizen of the United States, residing at Trenton, in the county of Mercer and State of New Jersey, have invented certain new and useful Improvements in Machines for Cutting Rubber Sealing-Rings for Jars and the Like; and I do hereby declare the following to be a full, clear, and exact description of the same, reference being had to the accompanying drawings, forming a part of this specification, and to the letters of reference marked thereon.

This invention relates to improvements in machines for cutting rubber rings such as are ordinarily employed for sealing jars and similar vessels, and more particularly to that class of machines wherein the rings are cut from a soft-rubber tube or sleeve mounted between suitable centers and rotated at a high rate of speed.

The invention has for its object to improve the mechanical details of the machine, render the same completely automatic in its action, and provide for a ready adjustment for cutting rings of different thickness, as well as for shifting the cutter manually, when so desired.

Referring to the accompanying drawings, Figure 1 is a perspective view looking at the front of a machine embodying my present improvements, the mandrel and rubber tube, together with the driving-belts, being omitted. Fig. 2 is a vertical section looking toward the right and showing the carriage in elevation.

In said drawings the letter A indicates a bed having ways $a$ thereon and adapted for the reception of head and tail stocks B and C, respectively. The spindle $b$ of the head-stock is driven from a suitable counter-shaft by a belt passing around a pulley $b'$ or by other suitable driving-gear, and it is adapted to rotate a mandrel upon which the rubber tube or sleeve from which the rings are cut is mounted. The center $c$ of the tail-stock C is adjusted longitudinally by means of a hand-wheel $c'$, and the tail-stock, if desired, may be adjustable longitudinally of the bed, these parts being preferably similar to corresponding parts of an ordinary turning-lathe, and therefore need not be further described.

Mounted on the ways $a$ so as to slide longitudinally of the bed is a carriage D, having an apron $d$ for supporting the feeding and controlling mechanism to be hereinafter described. Upon its upper surface the carriage is provided with transverse ways $d'$, upon which is mounted the supplemental carriage E, adapted to support the tool post or holder E'. A suitable tool for coöperating with the rubber tube or sleeve is mounted in the tool-holder, being held by the screw $e$, and in the operation of the machine the supplemental carriage and tool are moved inwardly to sever a ring, then drawn out, and while drawn out the main carriage is moved longitudinally of the bed a distance sufficient to equal the thickness of the rings desired to be cut, when the tool is again advanced to make another cut. These motions are preferably accomplished automatically, and the invention in the present case resides mainly in the mechanism employed therefor.

Referring to Fig. 1, it will be seen that on the front of the bed A and extending parallel therewith is a long cam F, mounted in bearings $f$ at each end of the bed and adapted to be rotated from a counter-shaft by a belt passing around a pulley $f'$ on the end of the cam-shaft. The rotation of the cam is preferably slow as compared with the rotation of the spindle and work, and its movement is utilized to both advance and retract the tool, as well as to advance the carriage between cuts. On the front of the main carriage D a bracket or bearing G is formed, in which is journaled a bell-crank lever H, one arm of which extends upwardly and is pivotally connected by means of a link I with the tool-holder or supplemental carriage E, while its other arm is bifurcated, and the two branches $h$ embrace the cam F, whereby the said lever is oscillated as the cam rotates and imparts a reciprocatory movement to the tool-holder and supplemental carriage. Wear-plates $h$ are preferably provided on the inner faces of the arms $h'$, and screws $h^2$ may be employed for adjusting the plates to take up wear due to the friction of the cam against said plates. The cam being of uniform diameter throughout, the carriage may be moved back and forth without obstruction and without varying the throw of the tool, and in order to feed the carriage the desired distance between each advance or cut made by the tool a rack K is provided on the front of the bed A, and meshing therewith is a pinion $k$, carried by the rear end of a shaft journaled in the apron $d$ and extending through to the front of said apron, where it is provided with a ratchet-wheel L. Immediately behind the ratchet-wheel L and journaled on the said shaft or on an axis coincident with said ratchet-wheel is a pawl-carrier M, one end of which is preferably weighted and provided with a spring N for holding that end of the carrier down and the opposite end up, while its opposite end is provided with a projection or block O, adapted to contact with the under side of the cam F. The pawl-carrier M is provided with a pawl P, one arm $p$ of which coöperates with the ratchet-wheel L to advance the ratchet-wheel each time the pawl-carrier is oscillated or the pawl depressed. The pawl is held in engagement with the ratchet-wheel by a spring $p'$ under normal circumstances; but in order to disengage the pawl from said wheel, so as to permit the carriage to be shifted longitudinally of the bed by hand, the pawl is provided with a releasing-arm $p^2$, which may be moved by hand, but is more particularly adapted to contact with a fixed stop Q on the apron whenever the pawl is depressed a sufficient distance, and the pawl-carrier is provided with a handle or projection R, by means of which it may be moved so as to disengage the pawl from the ratchet-wheel. The handle will also serve as a ready means for moving the carriage while holding the pawl disengaged. Furthermore, at the left-hand end of the bed there is provided an incline S, up which the left-hand end of the pawl-carrier is adapted to ride when the carriage is moved toward the left. Thus the incline will also cause the pawl-carrier to move a sufficient distance to disengage the pawl from the ratchet-wheel and so automatically arrest the advance movement of the carriage when it approaches the end of the bed.

In order to provide for cutting thick or thin rings, the ratchet-teeth on the ratchet-wheel L are preferably made relatively fine, and the projection O, which contacts with the cam for oscillating the pawl-carrier, is made adjustable toward and from the center of oscillation, so as to give the pawl-carrier any desired throw. This adjustment is secured by extending the right-hand arm of the pawl-carrier horizontally and mounting the projection O in a guide thereon, preferably a slot-guide $o$, where it is held by means of a set-screw $o'$. With this arrangement by moving the projection O toward or from the center of oscillation of the pawl-carrier the range of movement of the ratchet-wheel, and consequent feed imparted to the carriage, may be adjusted with the utmost nicety, and as a result rings may be cut of exactly the desired thickness.

To prevent any possible racing or overthrow of the ratchet-wheel, a friction-brake, consisting of a spring-shoe T, is provided adapted to bear against a friction-drum $t$, formed on the rear side of the ratchet-wheel. The tension of the spring-shoe is determined by a set-screw T', passing down through a hub T², journaled in a projection U on the apron. The hub T² is provided with a handle $t^3$ and it, together with the projection U, is provided with relatively-steep coöperating inclines, which when the hub is turned by the handle in one direction will raise the spring-shoe quickly into contact with the friction-drum; but in case it is desired to shift the carriage by hand the friction-brake may be as quickly and easily released by turning the handle in the opposite direction.

In operation it is obvious that the attendant having placed a mandrel carrying a rubber sleeve or tube in position and having shifted the carriage to the right-hand end of the bed may start the machine in operation, when the carriage will be automatically fed and the rings severed from the tube or sleeve in succession until the left-hand end of the bed is approached, when the carriage-feeding mechanism is automatically tripped and the carriage brought to rest. Should for any reason it be desired to shift the carriage at any time in its operation or in shifting it back to the starting-place, it is only necessary for the attendant to swing the handle $t^3$ around and grasping the handle R depress the pawl-carrier and draw the carriage back. Obviously the tool may be projected more or less to operate upon larger or smaller tubes or sleeves of rubber, and this, in connection with the adjustment for feed, renders the device practically universally adjustable with respect to the work to be performed.

Having thus described my invention, what I claim as new, and desire to secure by Letters Patent of the United States, is—

1. In a machine for cutting rubber rings, the combination with the bed, rotary work-holder and carriage movable longitudinally on the bed, of a rack-bar, and pinion mounted on the bed and carriage respectively, a ratchet-wheel connected with said pinion, a pawl coöperating with said ratchet-wheel, a pawl-carrier mounted on the carriage, a relatively-long cam journaled on the bed and coöperating with said pawl-carrier at any point in its length for rotating the ratchet-wheel to feed the carriage, a tool-holder, and independent connections between the tool-holder and cam for moving the holder transversely on the carriage; substantially as described.

2. In a tool-feeding mechanism for rubber-ring-cutting machines, the combination with the bed and a relatively-long cam journaled on said bed and arranged parallel therewith, of a carriage sliding on said bed, a transversely-movable tool-holder mounted on the carriage, independent connections coöperating with the cam for moving the tool-holder transversely, a rack-bar on the bed, a pinion meshing with said rack-bar and journaled on the carriage, a ratchet-wheel, connected with said pinion, a pawl-carrier and a projection on the pawl-carrier coöperating with the cam for moving the carriage transversely; substantially as described.

3. In a carriage-feeding mechanism for rubber-ring-cutting machines, the combination with a bed, a relatively-long cam journaled on said bed parallel therewith and a fixed rack-bar parallel with the cam, of a carriage, a pinion journaled on the carriage and meshing with the rack-bar, a ratchet-wheel connected with said pinion, a pawl coöperating with the ratchet-wheel, a pawl-carrier and an adjustable projection on said pawl-carrier for coöperating with the cam; substantially as described.

4. In a carriage-feeding mechanism for rubber-cutting machines, the combination with the bed, cam, rack-bar, and carriage mounted to move longitudinally on the bed, of a pinion meshing with the rack-bar, a ratchet-wheel, a pawl-carrier adapted to be oscillated by the cam, a pawl mounted on said carrier and adapted to coöperate with the ratchet-wheel, a releasing-arm on said pawl and a fixed stop with which said arms coöperate when the pawl-carrier is given an abnormal throw; substantially as described.

5. In a carriage-feeding mechanism for rubber-ring-cutting machines, the combination with a bed, work-holder, cam, rack-bar, and carriage mounted to move longitudinally on the bed, of the pinion journaled on the carriage and meshing with the rack-bar, the ratchet-wheel, pawl-carrier journaled on an axis coincident with the ratchet-wheel, the pawl journaled on the pawl-carrier, the spring for holding said pawl in position to engage the ratchet-wheel, the releasing-arm on said pawl, the fixed stop with which said arm coöperates when the pawl-carrier is given an abnormal throw and a fixed incline with which the pawl-carrier coöperates to release the pawl; substantially as described.

6. In a carriage-feeding mechanism for rubber-ring-cutting machines, the combination with the bed, work-holder, cam, rack-bar, and carriage mounted to move longitudinally on the bed, of the pinion journaled on the carriage and meshing with the rack-bar, the ratchet-wheel connected with the pinion, the pawl-carrier moved by the cam, the pawl journaled on said carrier, and having the releasing-arm, the fixed stop with which said arm contacts when the pawl-carrier is given an abnormal throw, a spring for holding said pawl-carrier against such movement and a fixed incline on the bed for moving the pawl-carrier against the tension of its spring and releasing the pawl; substantially as described.

7. In a feeding mechanism for the carriages of rubber-ring-cutting machines, the combination with the bed, the rotary work-holder, the cam, the rack-bar, and the carriage mounted to move longitudinally on the bed, of the pinion journaled on the carriage, and meshing with the rack-bar, the ratchet-wheel connected with the pinion, the pawl-carrier journaled on the carriage and having one of its arms extended parallel with the cam, an adjustable projection mounted on said arm and adapted to coöperate with the cam and a pawl carried by said pawl-carrier for coöperation with the ratchet-wheel; substantially as described.

8. In a carriage-feeding mechanism for rubber-ring-cutting machines, the combination with the bed, the rotary work-holder, the cam, the rack-bar and the carriage mounted to move longitudinally on the bed, of the pinion journaled on the carriage and meshing with the rack-bar, the ratchet-wheel connected with the pinion, the friction-drum on the ratchet-wheel, the pawl-carrier, the pawl, the throw-out stop for releasing said pawl when the carrier is given an abnormal throw, the friction-brake coöperating with the drum and a quick release for said friction-brake embodying a rotary hub and coöperating relatively-steep inclines, whereby when said hub is rotated, the friction-brake will be thrown into and out of engagement with the drum; substantially as described.

JOHN E. THROPP, JR.

Witnesses:
LEWIS C. MCCLURG,
CHAS. H. ENGLISH.